(12) United States Patent
Zeniya et al.

(10) Patent No.: US 7,619,859 B2
(45) Date of Patent: Nov. 17, 2009

(54) ELECTRIC POWER STEERING DEVICE

(75) Inventors: Susumu Zeniya, Tokyo (JP); Shigeki Otagaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 303 days.

(21) Appl. No.: 11/586,566

(22) Filed: Oct. 26, 2006

(65) Prior Publication Data
US 2007/0247766 A1 Oct. 25, 2007

(30) Foreign Application Priority Data
Apr. 19, 2006 (JP) .............................. 2006-115635

(51) Int. Cl.
*H02H 5/04* (2006.01)

(52) U.S. Cl. .............................. 361/25; 361/23; 361/24; 318/400.06; 318/471; 701/41; 701/42; 701/43; 180/446; 180/412; 180/415; 180/421; 180/422; 180/443

(58) Field of Classification Search ................. 318/422, 318/400.06, 471; 361/23–25, 93.9; 180/446, 180/412, 415, 421, 422, 443; 701/41–43
See application file for complete search history.

(56) References Cited

U.S. PATENT DOCUMENTS

| 5,596,252 | A | * | 1/1997 | Shimizu et al. ............. 318/432 |
|---|---|---|---|---|
| 7,164,248 | B2 | * | 1/2007 | Hayashi ...................... 318/434 |
| 2002/0179363 | A1 | * | 12/2002 | Takatsuka et al. ........... 180/446 |
| 2003/0144780 | A1 | * | 7/2003 | Recker et al. ................. 701/41 |
| 2004/0222037 | A1 | * | 11/2004 | Takatsuka et al. ........... 180/446 |
| 2005/0269150 | A1 | | 12/2005 | Fujimoto et al. |

FOREIGN PATENT DOCUMENTS

| JP | 03-132472 A | 6/1991 |
|---|---|---|
| JP | 592054 U | 12/1993 |
| JP | 2002-034283 A | 1/2002 |
| JP | 2002-370660 A | 12/2002 |
| JP | 2004-336975 A | 11/2004 |
| JP | 2005007951 A | 1/2005 |
| JP | 2005343293 A | 12/2005 |
| JP | 2006082797 A | 3/2006 |

* cited by examiner

*Primary Examiner*—Rita Leykin
(74) *Attorney, Agent, or Firm*—Sughrue Mion, PLLC (57) ABSTRACT

An electric power steering device that can estimate an ambient temperature and apply current limiting without using ambient temperature detecting means is provided. The electric power steering device includes a motor that supplements the driver's steering force, a controller that determines and controls the quantity of current passed to the motor, and vehicle speed detecting means. The electric power steering device includes ambient temperature estimating means provided with a vehicle speed signal input from the vehicle speed detecting means and limits the quantity of current passed to the motor according to an output from the ambient temperature estimating means.

13 Claims, 7 Drawing Sheets

ELECTRIC POWER STEERING DEVICE

BACKGROUND OF THE INVENTION

1. Field of the Invention

The present invention relates to an automotive electric power steering device in which an electric motor is used to supplement steering torque generated by the driver's steering force.

2. Description of the Related Art

In the field of electric power steering devices, various approaches have been suggested to restrict the upper limit for indicator current to an auxiliary electric motor under a predetermined condition, so that the auxiliary electric motor is not overheated by overload.

Figure 3:
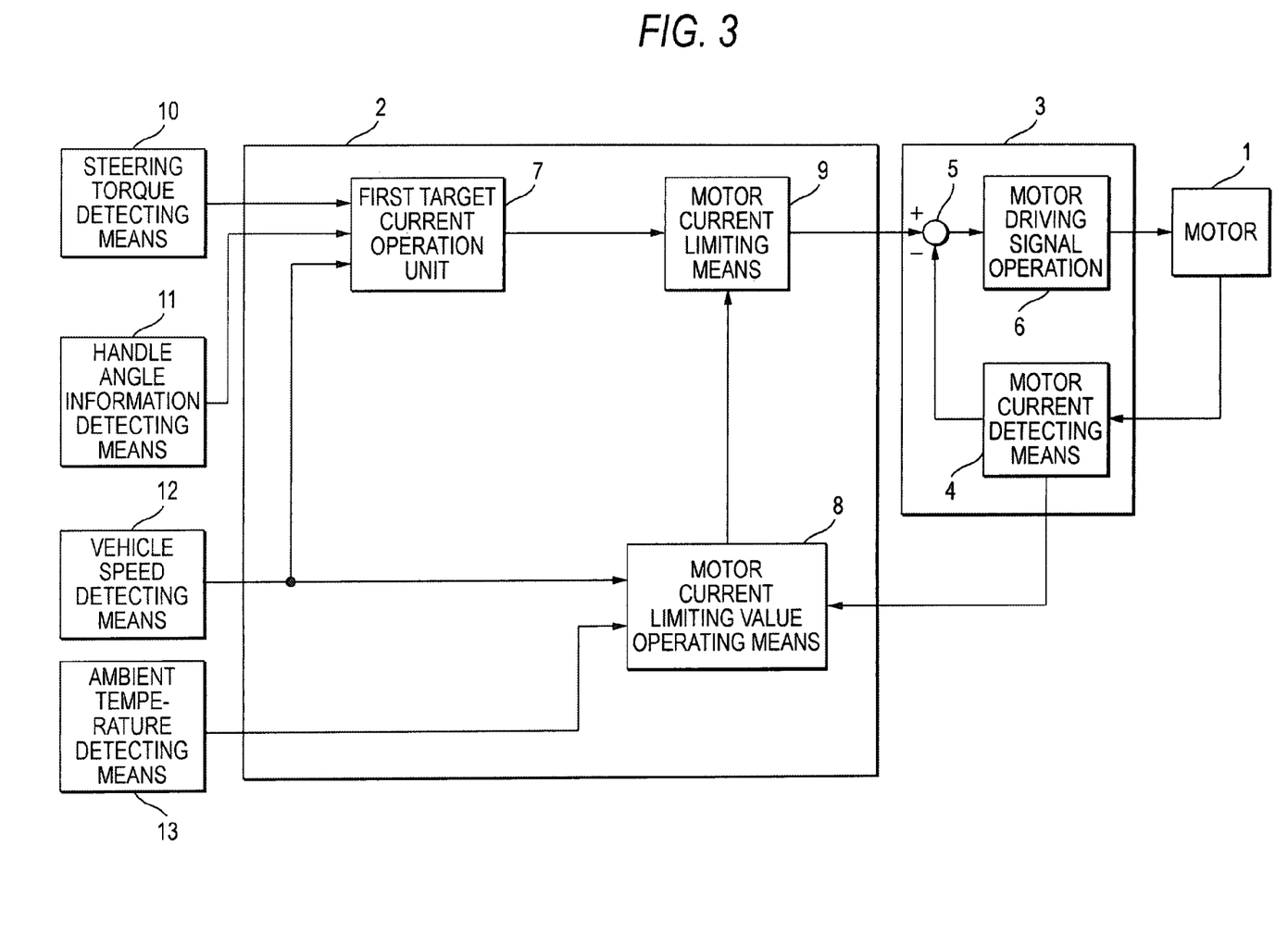
FIG. 3 is a diagram showing control of a conventional electric power steering.

FIG. 3 is a diagram showing an example of a method of controlling indicator current to a motor by a conventional electric power steering device (see for example JP-A-2002-370660). In FIG. 3, the electric power steering device includes a motor 1 that supplements the driver's steering force, a target current operation unit 2 that calculates current to be passed to the motor 1 for supplementing the driver's steering force, and a motor current control unit 3 that calculates a motor driving signal for the target current from the target current operation unit 2 and controls the motor current.

The motor current control unit 3 includes a motor current detecting circuit 4 that detects the motor current, a comparator 5 that compares a current command from the target current operation unit 2 and an output from the motor current detecting circuit 4, and motor driving signal operation means 6 for calculating a motor driving signal in response to the output received from the comparator 5 so that the current deviation is nullified and thus controlling the motor current.

The motor target current operation unit 2 includes a first target current operation unit 7 that calculates a first target current determined based on detection torque from steering torque detecting means 10 and outputs from handle angle information detecting means 11 and vehicle speed detecting means 12, motor current limiting value operation means 8 for preventing the motor and the controller from being overheated because of motor overload based on inputs from the vehicle speed detecting means 12, ambient temperature detecting means 13, and the motor current detecting means 4 in the motor current control unit 3, and the motor current limiting means 9 in the motor current control unit 3, and motor current limiting means 9 for keeping the output of the first target current operation unit 7 below the output of the motor current limiting value operation means 8.

In this example, the motor current limiting value operation means 8 uses an ambient temperature value obtained by the ambient temperature detecting means 13 as an initial value and thereafter limits the motor current based on an ambient temperature estimation value obtained by shifting the ambient temperature value to the lower temperature side as the vehicle travels for a prescribed period or more and the quantity of heat generated from the motor and the controller estimated by adding up outputs from the motor current detecting circuit 4.

As described above, in the disclosure of JP-A-2002-370660, the device includes the motor current limiting value operation means 8, and the current limit for the motor indicator current value is determined based on a heat quantity estimation value obtained by adding up motor currents from the motor current detecting means 4 and an ambient temperature obtained from the ambient temperature detecting means 13. If the ambient temperature obtained from the ambient temperature detecting means 13 is high and the motor and the controller are located in the vehicle interior, the current limiting is eased in expectation of a decrease in the vehicle interior temperature after travelling for a prescribed period or more.

However, if a vehicle does not have such means for detecting the ambient temperature, the case of the maximum temperature in use must be assumed, and the current can be limited excessively, which lowers the supplementing effect by the motor. Even with the means for detecting the ambient temperature, it would be difficult to obtain accurate ambient temperature because of the effect of heat generated from the motor after current is passed to the motor. If the motor and the controller are located outside the compartment, an air stream created by the running vehicle or heat from the engine can greatly affect the ambient temperature.

SUMMARY OF THE INVENTION

The invention is directed to an improvement to the above described disadvantages and it is an object of the invention to provide an electric power steering device that can apply current limiting based on estimated ambient temperature without using ambient temperature detecting means.

An electric power steering device according to the invention includes a motor that supplements the steering force of a driver, a controller that determines and controls the amount of current passed to the motor, and vehicle speed detecting means. The device includes ambient temperature estimating means provided with a vehicle speed signal input from the vehicle speed detecting means, and the amount of current passed to the motor is limited based on an output from the ambient temperature estimating means.

As described above, according to the invention, the ambient temperature is estimated using the vehicle speed signal, so that the electric power steering device that does not excessively limit the motor current can be obtained.

DETAILED DESCRIPTION OF THE PREFERRED EMBODIMENTS

First Embodiment

Figure 1:
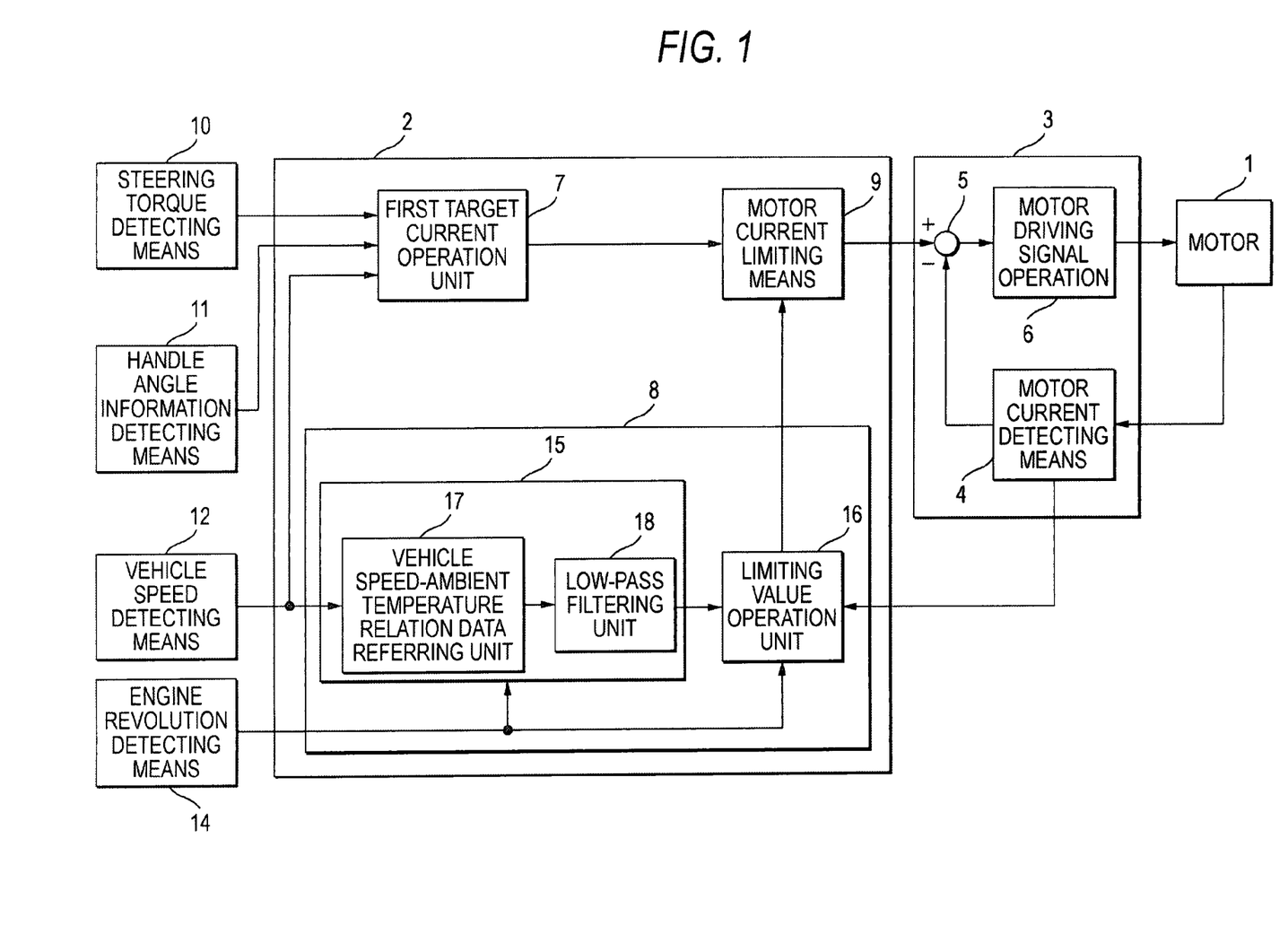
FIG. 1 is a diagram showing control of electric power steering according to a first embodiment of the invention.

FIG. 1 is a diagram showing the general structure of control of the electric power steering according to a first embodiment of the invention. In FIG. 1, the same reference characters as those in FIG. 3 denote the same or corresponding portions.

The electric power steering device according to the first embodiment includes a motor 1 that supplements the driver's steering force, a target current operation unit 2 that calculates current to be passed to the motor 1 for supplementing the driver's steering force, and a motor current control unit 3 that calculates a motor driving signal for a target current from the target current operation unit 2 and controls the motor current. The target current operation unit 2 and the motor current control unit 3 are each made of a controller including a CPU, a RAM, a ROM, and the like.

As with the unit shown in FIG. 3, the motor current control unit 3 includes a motor current detecting circuit 4 that detects the motor current, a comparator 5 that compares a current command from the target current operation unit 2 and the output from the motor current detecting circuit 4, and motor driving signal operation means 6 for calculating a motor driving signal in response to the output received from the comparator 5 so that the current deviation is nullified and thus controlling the motor current.

The motor target current operation unit 2 includes a first target current operation unit 7 that calculates a first target current determined based on detection torque from the steering torque detecting means 10 and outputs from handle angle information detecting means 11 and vehicle speed detecting means 12, motor current limiting value operation means 8 for preventing the motor and the controller from being overheated by motor overload based on inputs from the vehicle speed detecting means 12, engine revolution detecting means 14, and the motor current detecting means 4, and motor current limiting means 9 for keeping the output of the first target current operation unit 7 below the output of the motor current limiting value operation means 8.

The difference from FIG. 3 is that the motor current limiting value operation means 8 includes ambient temperature estimating means 15 and a limiting value operation unit 16, that the ambient temperature estimating means 15 includes a vehicle speed-ambient temperature relation data referring unit 17 and a low-pass filtering unit 18, and that the ambient temperature detecting means 13 in FIG. 3 is replaced by the engine revolution detecting means 14 according to the invention.

In the circuit configuration in FIG. 1, a signal from the vehicle speed detecting means 12 is input to the ambient temperature estimating means 15. The vehicle speed-ambient temperature relation data referring unit 17 has saturated ambient temperature during a constant speed driving obtained in advance by driving tests or the like as data for each vehicle speed and outputs ambient temperature data in response to an input from the vehicle speed detecting means 12. The ambient temperature data is input to the low-pass filtering unit 18. The low-pass filtering unit 18 is a primary low-pass filter having a time constant for a response lag in the ambient temperature of the motor and the controller in response to change in the vehicle speed and is inserted so that the temperature data after filtering indicates a highly accurate ambient temperature estimation value as will be described.

The limiting value operation unit 16 determines a motor current limiting value based on the quantity of heat generated from the motor and the controller estimated by adding up outputs from the motor current detecting means 4 and the ambient temperature estimation value by the ambient temperature estimating means 15. As with the case shown in FIG. 3, the motor current limiting means 9 limits target current to be not more than the limiting value if the output of the first target current operation unit 7 is more than the limiting value from the limiting value operation unit 16.

Note that the motor and the controller are heated by engine heat when the vehicle is at rest but cooled by an unassisted air stream created while the vehicle runs. Therefore, the ambient temperature data of the vehicle speed-ambient temperature relation data referring unit 17 is set so that the temperature is at its maxim when the vehicle is at rest and decreases as the vehicle speed increases. The initial value when the low-pass filtering unit 18 is activated is set to the maximum value for the use temperature condition while the engine is cold.

The ambient temperature estimating means 15 and the limiting value operation unit 16 are provided with signal inputs from the engine revolution detecting means 14. Therefore, if the engine revolution is off, the ambient temperature estimation or current limiting processing can be continued without cutting off the CPU power supply of the controller until after a prescribed period necessary for the engine to cool. Therefore, when the ignition switch is turned on again as the engine is warmed up, the low-pass filtering or motor current limiting is not initialized, so that the motor current limiting suitable for the ambient temperature is continued.

Figure 4:
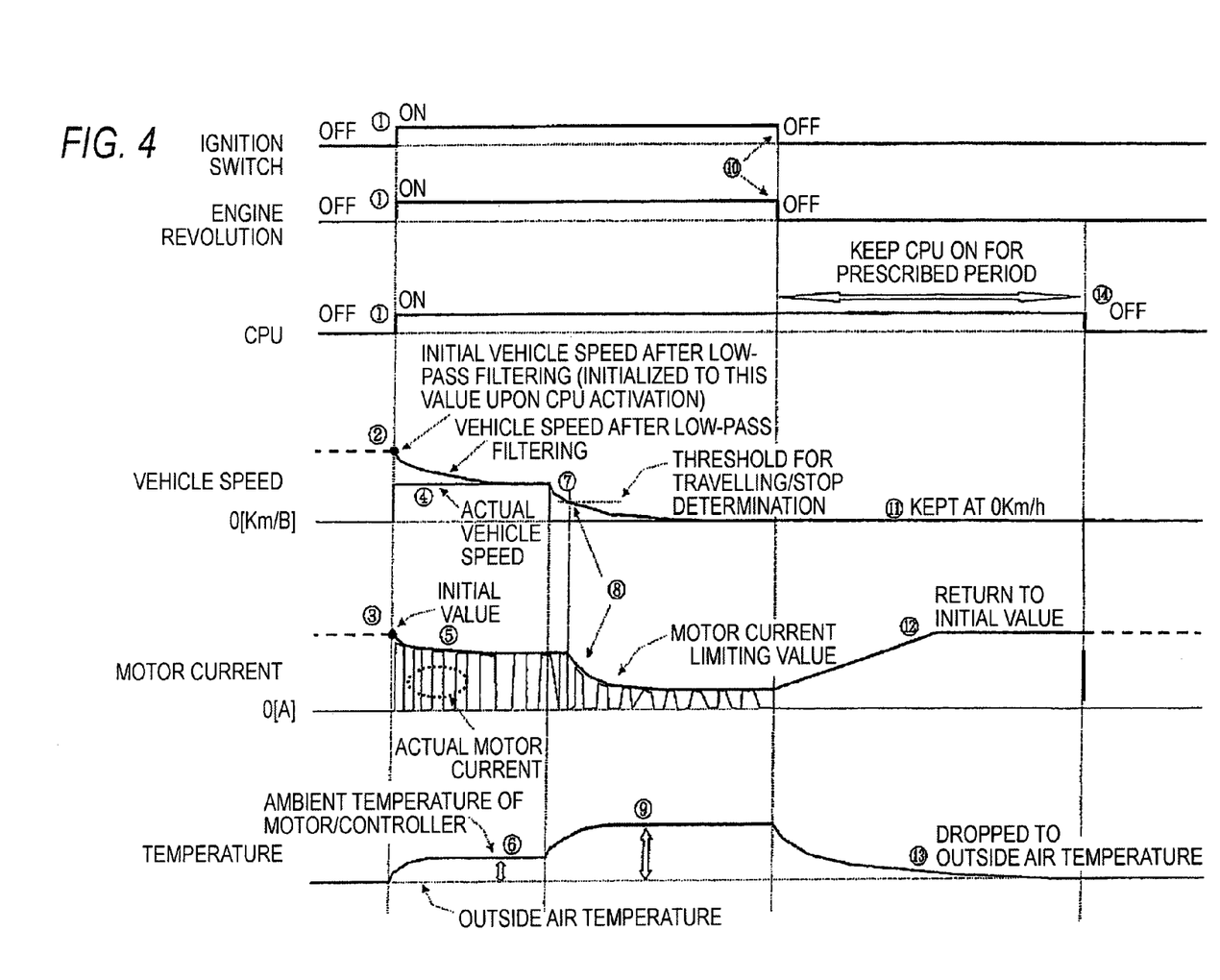
FIG. 4 is a pattern chart when only one cycle of turning on/off of an ignition switch is carried out.
Figure 5:
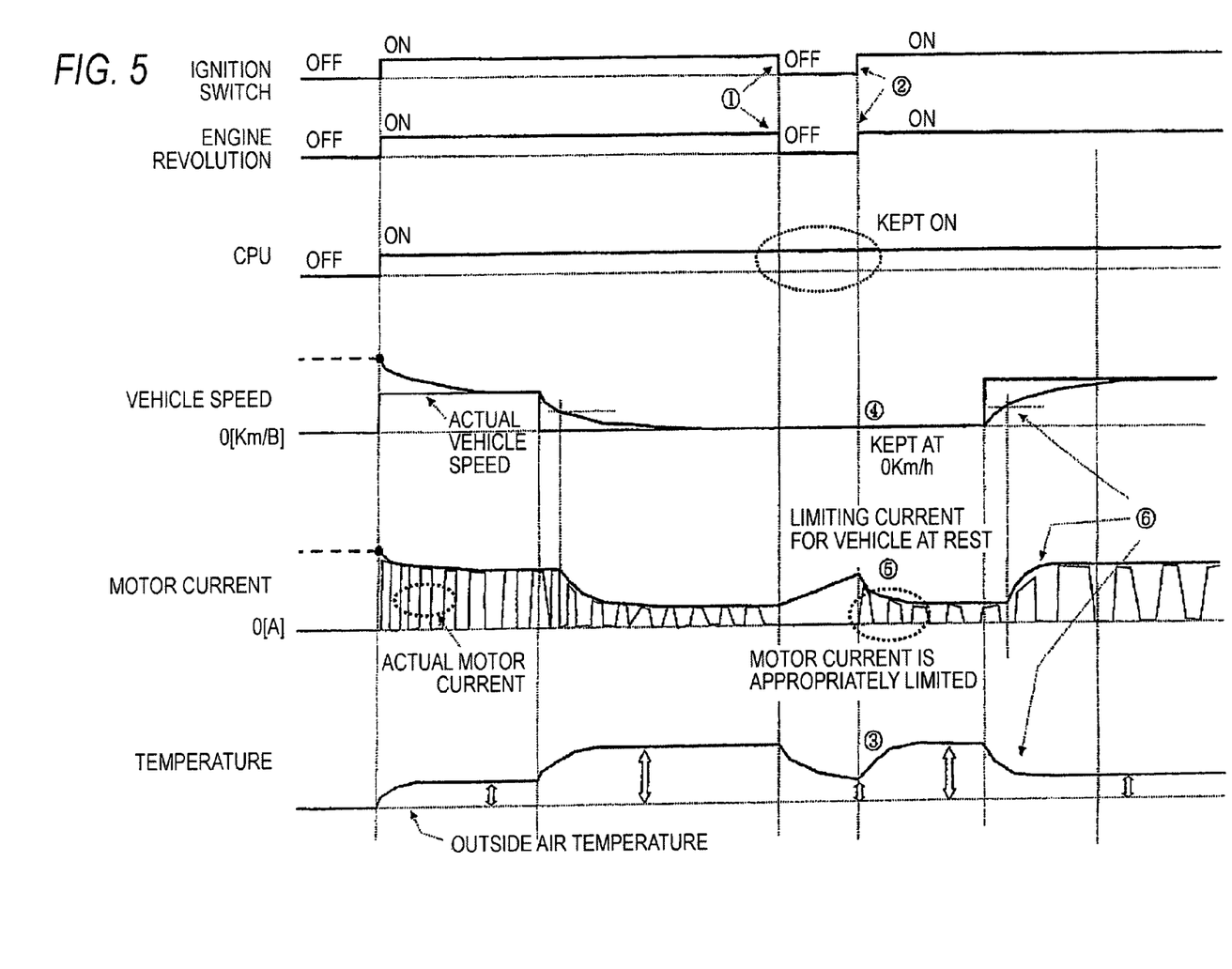
FIG. 5 is a pattern chart when the ignition switch is turned off and then turned on again before a prescribed period elapses.

Now, the operation during the period will be described in detail. FIGS. 4 and 5 show the operation of how the ambient temperature estimation and the current limiting processing are continued when the CPU power supply is not cut off for a prescribed period necessary for the engine to be cooled after the engine revolution is off, in which the abscissa represents the time base.

FIG. 4 is a pattern chart when only one cycle of turning on/off of the ignition switch is carried out, and FIG. 5 is a pattern chart when the ignition switch is turned off and then turned on again before a prescribed time period elapses.

In FIG. 4, when the ignition switch is turned on, the engine starts to rotate by a self starter motor, and the CPU is activated at the same time (see ①).

When the CPU is activated, the vehicle speed after low-pass filtering is set to the initial value A (see ②) while the motor current limiting value is set to the initial value B (see ③).

Assuming that the vehicle has traveled at constant speed, the vehicle speed after low-pass filtering converges to the actual vehicle speed with a prescribed time constant (see ④). Then, when the motor current is passed, the motor current is limited in response to the quantity of heat generated accordingly (see ⑤).

The ambient temperature of the motor and the controller is raised by heat from the engine, the radiator, and the like. Meanwhile, the temperature is slightly lowered by an air stream created by the running vehicle (see ⑥).

Assuming that the vehicle stops now, the vehicle speed after low-pass filtering converges toward 0 Km/h with a prescribed time constant (see ⑦). When the vehicle speed after low-pass filtering decreases to the prescribed threshold L or less, the CPU determines that the vehicle is at rest and further lowers the motor current limiting value so that overheating is prevented (see ⑧). When however the vehicle is at rest, there is no longer the cooling effect by the air stream created by the running vehicle, and therefore the ambient temperature of the motor and the controller further rises (see ⑨).

Then, assume that the ignition switch is turned off and the engine stops (see ⑩). The vehicle speed after low-pass filtering is still at 0 Km/h (see ⑪), the actual motor current is zero, and therefore the current limiting value is gradually raised and returned to the initial value (see ⑫).

When the temperatures of the engine, the radiator, and the like are lowered after the engine is stopped, the ambient temperature of the motor and the controller is eventually lowered to the level of the outside air temperature (see ⑬).

After a prescribed time period T elapses from the engine stop, the CPU is turned off (see ⑭). The prescribed time period T is set to be longer than the time necessary for the ambient temperature denoted by the circled 13 to be lowered to the outside air temperature. Then, when the ignition switch is turned on again, the process returns to the start (see ①) and the same operation is repeated.

Now, the case in FIG. 5 in which the ignition switch is turned off and then turned on again before the prescribed time period elapses will be described.

The operation of the ignition switch from turning on to turning off is the same as that described in conjunction with FIG. 4 (see ①). Assume that after the ignition switch is turned off, the switch is turned on again before the prescribed time period elapses, and the engine starts (see ②). At the time, the ambient temperature of the motor and the controller is still not lowered to the outside air temperature, and the temperatures of the engine and the radiator increase by the start of the engine, so that the ambient temperature of the motor and controller is raised as well (see ③).

The vehicle speed after low-pass filtering is still at 0 Km/h (see ④) and therefore the CPU carries out motor current limiting for a vehicle at rest, and the current limiting based on the ambient temperature continues (see ⑤). Then, the vehicle starts to travel, the ambient temperature of the motor and the controller is lowered by the effect of an air stream created by the running vehicle, and the motor current limiting value is raised accordingly (see ⑥).

As described above, "the function of continuing the ambient temperature estimation and the current limiting without turning off the CPU until after a prescribed time period" permits the current to be limited in a manner adapted to the ambient temperature after the ignition switch is turned on again.

Figure 6:
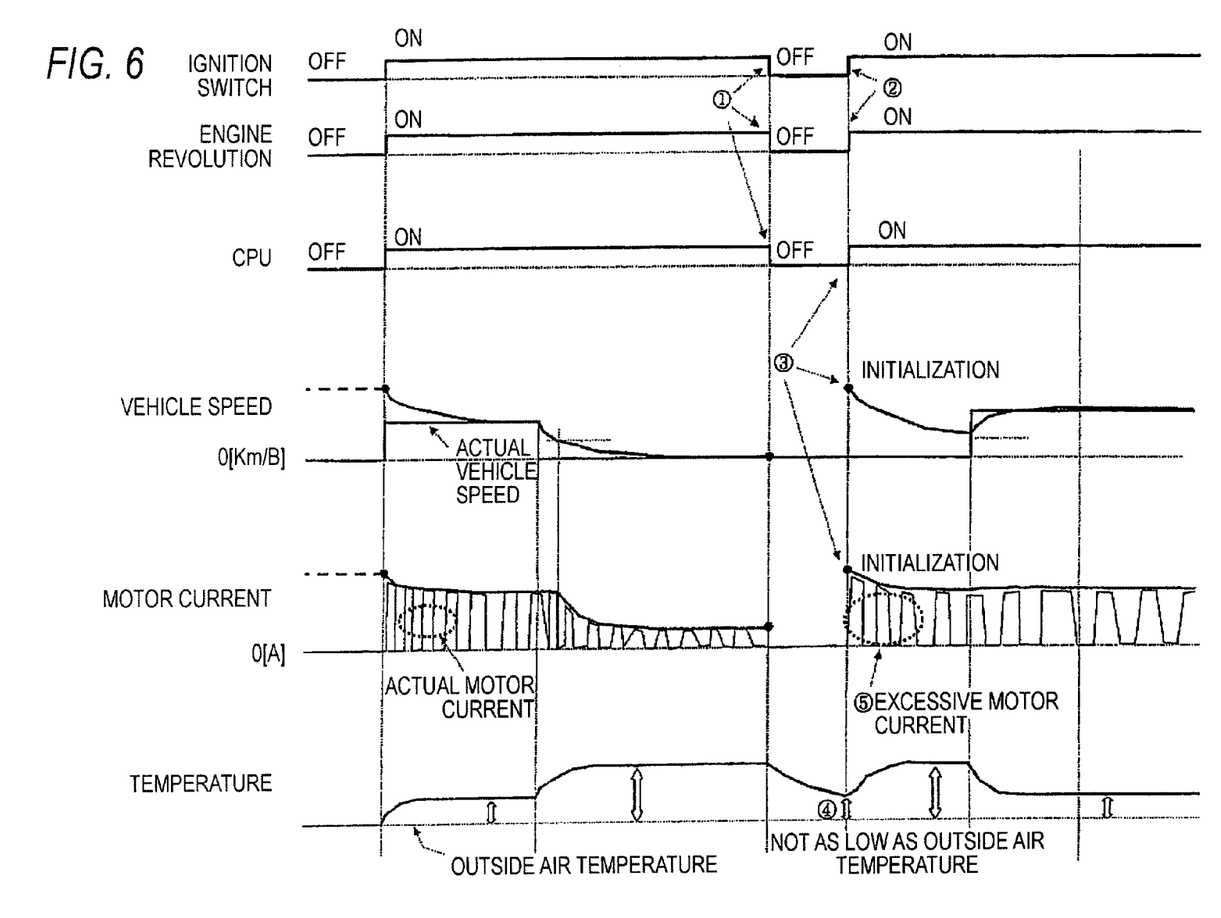
FIG. 6 is a pattern chart showing how a conventional device operates when an ignition switch is turned off and then turned on again before a prescribed period elapses.

For the purpose of facilitating the understanding of the present invention, the case in which there is no such "function to keep the CPU on until after a prescribed time period" and the CPU is turned off together when the ignition switch is turned off will be described with reference to FIG. 6. The operation from turning on to turning off of the ignition switch is the same as that described in conjunction with FIGS. 4 and 5 (see ①). When the ignition switch is turned off, the CPU is turned off as well, so that the vehicle speed after low-pass filtering and the current limiting value are lost.

Assuming that the ignition switch is turned off, then the ignition switch is turned on again before a prescribed time period elapses, and the engine starts (see ②), the CPU is re-activated, and the vehicle speed after low-pass filtering and the current limiting value are reset to the initial values (see ③). At the time, the engine and the radiator are not yet cooled, and the ambient temperature of the motor and the controller is still higher than the outside air temperature (see ④). After the vehicle speed after low-pass filtering is lowered and before the motor current limiting is applied, motor current in the same amount as that when the ambient temperature is equal to the outside air temperature is allowed to be passed though the ambient temperature is still high. This causes an overheated state (see ⑤).

As in the foregoing, the first embodiment of the invention includes the vehicle speed detecting means and the ambient temperature estimating means including the vehicle speed-ambient temperature relation data referring unit and the low-pass filtering unit, and therefore the ambient temperature can be estimated without using the ambient temperature detecting means. Therefore, the operation of limiting the motor indicator current can be more accurate and an electric power steering device with an improved steering feeling can be provided.

Since signals are input from the engine revolution detecting means, the ambient temperature estimation and the current limiting processing can be continued before the prescribed time period elapses after the engine revolution is off, without turning off the CPU. Therefore, when the ignition switch is turned on again with the engine in a warmed-up state, the low-pass filtering and the motor current limiting are not initiated, so that motor current limiting suitable for the ambient temperature is continued.

Second Embodiment

Figure 2:
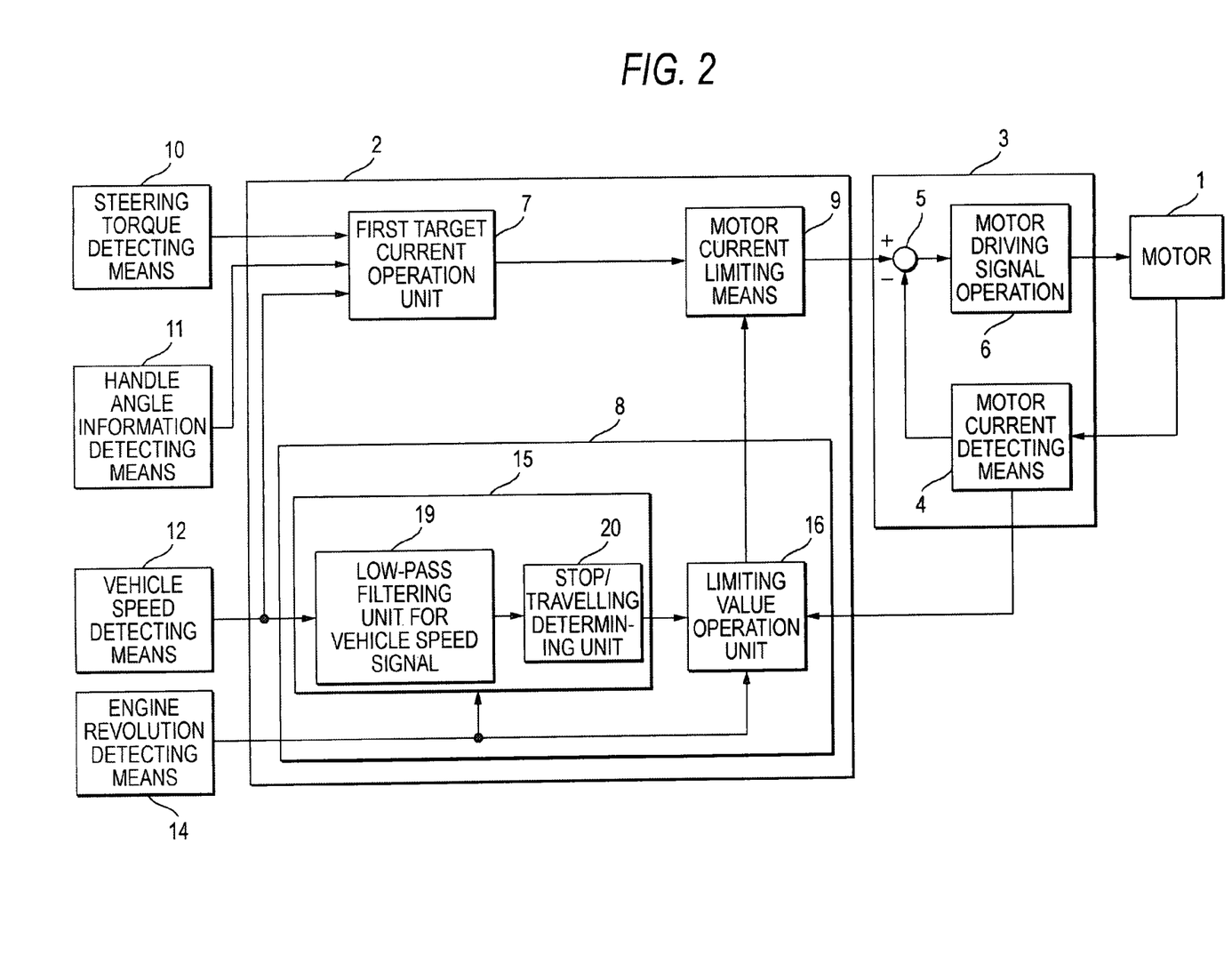
FIG. 2 is a diagram showing control of an electric power steering according to a second embodiment of the invention.

FIG. 2 is a diagram showing control of electric power steering according to a second embodiment of the invention. In FIG. 2, reference characters same as those in FIG. 1 denote the same or corresponding portions. The difference from FIG. 1 is that the ambient temperature estimating means 15 is made of a low-pass filtering unit 19 for the vehicle speed signal and a stop/travelling determining unit 20, and the other part is the same.

In the electric power steering device in FIG. 2, a signal from the vehicle speed detecting means 12 is input to the low-pass filtering unit 19 for the vehicle speed signal. The low-pass filtering unit 19 for the vehicle speed signal is a primary low-pass filter that has a time constant for a response lag in the ambient temperature in response to change in the vehicle speed and the vehicle speed signal after filtering is input to the stop/travelling determining unit 20. The stop/travelling determining unit 20 determines that the vehicle is at rest if the vehicle speed signal after filtering is less than a prescribed threshold (such as 20 Km/h) and that the vehicle is travelling if the speed is larger than the threshold.

The limiting value operation unit 16 transmits current pattern signals to the motor current limiting means 9 based on ambient temperature estimation values obtained according to the quantity of heat generated from the motor and the controller estimated by adding up outputs from the motor current detecting circuit 4 and the result of determination by the stop/travelling determining unit 20. The signals are based on assumptions that the temperature is for example in the range from 40° C. to 50° C. if the vehicle is travelling and not less than 80° C. if the vehicle is at rest. The unit thus determines a motor current limiting value. Note that the threshold to be compared to the vehicle speed signal after filtering may be provided with a hysteresis.

Figure 7A:
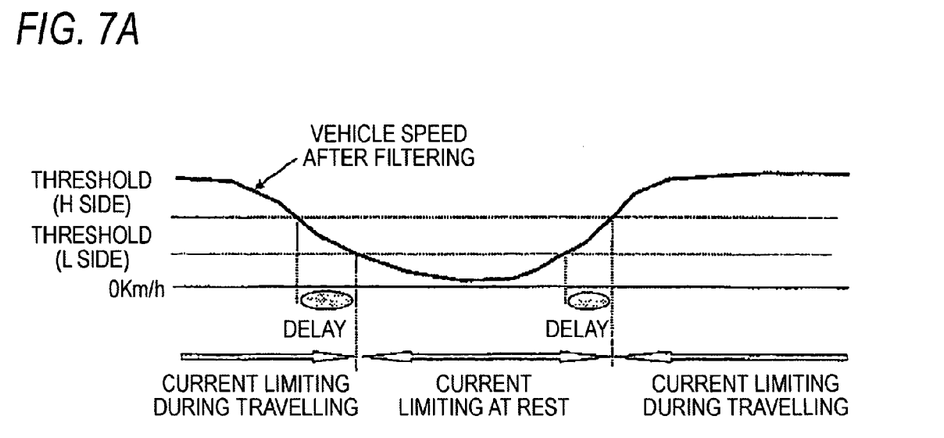
FIGS. 7A and 7B are charts for use in illustrating an effect brought about when thresholds to be compared to a vehicle speed signal after filtering are provided with hystereses.
Figure 7B:
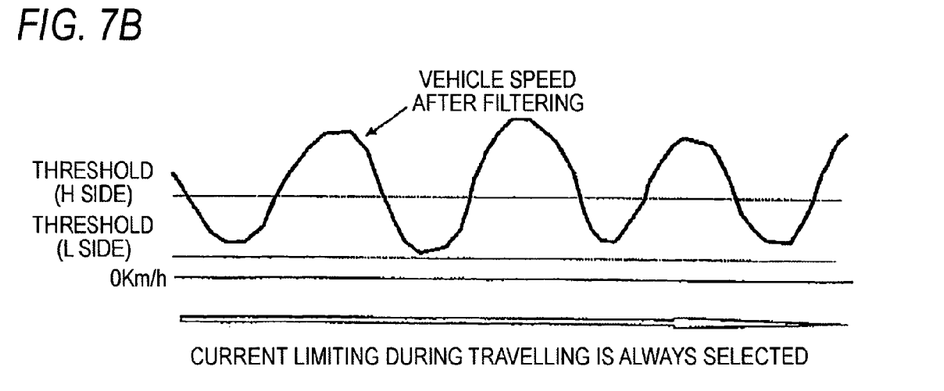

FIGS. 7A and 7B are charts each illustrating an effect brought about when the threshold to be compared to the vehicle speed signal after filtering is provided with a hysteresis. In FIG. 7A, the thresholds are provided with hystereses (on the H side and the L side), so that a lag can be provided in stop/traveling determination, which allows settings to be more suitably adapted to the temperature changes of an actual vehicle. In FIG. 7B, when the vehicle speed after filtering changes, the addition of hystereses allows the current limiting during traveling to be constantly applied, so that the current limiting can be prevented from being excessively carried out.

According the second embodiment, it is only necessary that the limiting value operation unit 16 selects and outputs two current pattern signals for the vehicle during travelling and at rest based on the determination of stop/travelling, so that it is not necessary to produce data on the relation between the vehicle speed and the ambient temperature in advance unlike the first embodiment, which allows a simple control system to be formed. The thresholds to be compared to the vehicle speed signal after filtering may be provided with a hysteresis, so that settings more suitably adapted to the temperature change in an actual vehicle can be made and more flexibility in design may be provided.

What is claimed is:

1. An electric power steering device including a motor that supplements the steering force of a user, a controller that determines and controls the amount of current passed to said motor, and vehicle speed detecting means, said device comprising ambient temperature estimating means provided with a vehicle signal input from said vehicle speed detecting means, the amount of current passed to said motor being limited based on an output from said ambient temperature estimating means, wherein said ambient temperature estimating means has a saturated ambient temperature for travelling at a fixed vehicle speed as data for each vehicle speed, refers to said saturated ambient temperature data in response to a vehicle speed signal from said vehicle speed detecting means and outputs the data as an ambient temperature estimation value.

2. The electric power steering device according to claim 1, wherein said ambient temperature estimating means subjects ambient temperature data obtained from said saturated ambient temperature data to filtering processing having a characteristic corresponding to a response lag in the ambient temperature relative to change in the vehicle speed.

3. The electric power steering device according to claim 2, further comprising engine revolution detecting means, wherein after the ignition switch is turned off, said filtering processing and said limiting processing for the amount of motor current are continued until a prescribed time period elapses after the engine revolution is off.

4. An electric power steering device including a motor that supplements the steering force of a user, a controller that determines and controls the amount of current passed to said motor, and vehicle speed detecting means, said device comprising ambient temperature estimating means provided with a vehicle signal input from said vehicle speed detecting means, the amount of current passed to said motor being limited based on an output from said ambient temperature estimating means, wherein said ambient temperature estimating means estimates an ambient temperature based on the magnitudes of the output of said vehicle speed detecting means and a prescribed value, and wherein said ambient temperature estimating means subjects a vehicle speed signal from the vehicle speed detecting means to filtering processing having a characteristic corresponding to a response lag in the ambient temperature relative to change in the vehicle speed.

5. The electric power steering device according to claim 4, wherein said ambient temperature estimating means includes a stop/travelling determining unit that determines that the vehicle is at rest if a vehicle speed signal after filtering is smaller than a prescribed threshold and that the vehicle is travelling if the signal is greater than the threshold.

6. The electric power steering device according to claim 4, further comprising engine revolution detecting means, wherein after the ignition switch is turned off, said filtering processing and said limiting processing for the amount of motor current are continued until a prescribed time period elapses after the engine revolution is off.

7. The electric power steering device according to claim 5, wherein a threshold to be compared to the vehicle speed signal after filtering is provided with a hysteresis.

8. The electric power steering device according to claim 1, wherein said ambient temperature estimating means estimates an ambient temperature based on the magnitudes of the output of said vehicle speed detecting means and a prescribed value.

9. The electric power steering device according to claim 1, wherein the ambient temperature estimating means estimates an ambient temperature without measuring an actual temperature value in a vicinity of the motor.

10. The electric power steering device according to claim 1, wherein the vehicle signal represents a speed of a vehicle in which the electric power steering device is mounted.

11. The electric power steering device according to claim 4, wherein said ambient temperature estimating means estimates an ambient temperature based on the magnitudes of the output of said vehicle speed detecting means and a prescribed value.

12. The electric power steering device according to claim 4, wherein the ambient temperature estimating means estimates an ambient temperature without measuring an actual temperature value in a vicinity of the motor.

13. The electric power steering device according to claim 4, wherein the vehicle signal represents a speed of a vehicle in which the electric power steering device is mounted.

* * * * *